United States Patent [19]
Straut, Jr. et al.

[11] 3,782,207
[45] Jan. 1, 1974

[54] SPOOL AND SLEEVE PNEUMATIC ACCELEROMETER

[76] Inventors: Harold J. Straut, Jr., 1532 Neola Tr., Winter Park, Fla. 32789;
Raymond E. Weber, 27 Zabriskie St., Jersey City, N.J. 07307

[22] Filed: Sept. 14, 1972

[21] Appl. No.: 289,022

[52] U.S. Cl. .................................................. 73/515
[51] Int. Cl. .............................................. G01p 15/02
[58] Field of Search .............................. 73/515, 516

[56] References Cited
UNITED STATES PATENTS

| | | | |
|---|---|---|---|
| 3,315,531 | 4/1967 | Grimland | 73/515 |
| 3,263,505 | 8/1966 | Grumwald | 73/515 |
| 3,527,105 | 9/1970 | Weisbord et al. | 73/515 |

*Primary Examiner*—James J. Gill
*Attorney*—Harry M. Saragovitz et al.

[57] ABSTRACT

A pneumatic accelerometer employing a five land spool operating in a cylinder, wherein, the fluidic output of the assembly is linear with the amount and direction of the displacement of the spool within the cylinder.

4 Claims, 2 Drawing Figures

3,782,207

SPOOL AND SLEEVE PNEUMATIC ACCELEROMETER

BACKGROUND OF THE INVENTION

The importance of providing an accurate and dependable accelerometer becomes greater as modern missiles improve in various aspects of their performance. The accelerometer serves several purposes within the typical missile system. To be acceptable for a missile system the accelerometer must be compact, extremely accurate, and dependable under conditions of severe forces and vibrations which the missile system will encounter during flight.

The present invention utilizes only one moving part which controls a flow of fluid to a pneumatic servo or control system. The device is extremely small, its size being dependent only upon available methods of fabrication. Further, the device is simple in design and lends itself to rugged construction.

It has long been a problem to provide an acceleromter which meets the stringent requirements of accuracy, simplicity, and ruggedness which are demanded of missile accelerometer. Further, to be effective for modern warfare the accelerometer must be capable of dependable operation in an environment of radiant energy.

Thus, the primary object of my invention is to provide an extremely dependable accelerometer having a single moving part.

Another object of my invention is to provide an accelerometer which is capable of maintaining accuracy under severe conditions of force and vibration.

A further object of my invention is to provide an accelerometer which is capable of dependable operation in an environment of radiant energy.

Yet another object of my invention is to provide an accelerometer which is extremely durable.

Still another object of my invention is to provide an accelerometer the output of which consists of a proportional flow of fluids.

A further object of my invention is to provide an accelerometer which uses pressurized fluid as its sole controlling output force.

Still another object of my invention is to provide an accelerometer which is sensitive to minor accelerations while yet capable of functioning accurately when subjected to extreme forces of acceleration.

DETAILED DESCRIPTION OF THE INVENTION

Figure 1:
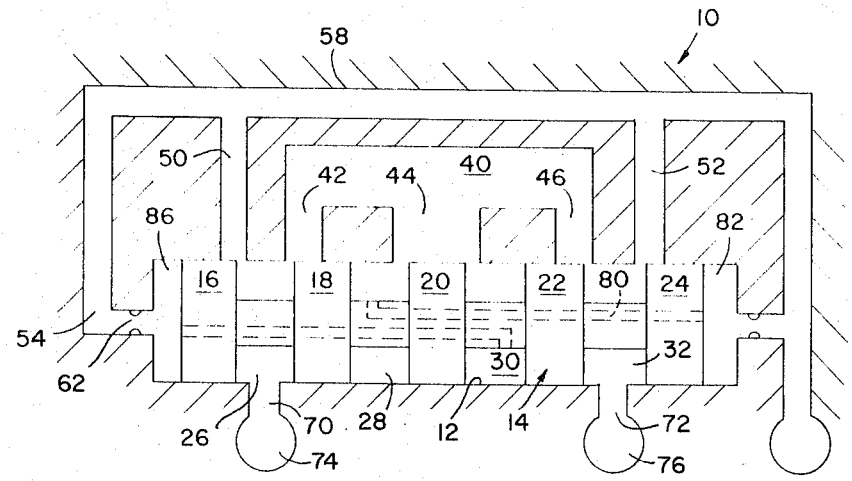
FIG. 1 is a schematic illustration of the accelerometer of the present invention shown under the condition of no acceleration.

The accelerometer of the present invention incorporates a housing schematically indicated at 10. The housing 10 has incorporated therein a cylinder 12 within which a spool valve generally indicated 14 is slideably mounted. The spool valve 14 is formed with five spaced lands indicated 16, 18, 20, 22 and 24 which define four chambers 26, 28, 30 and 32.

A chamber 40 is formed in the housing 10 and is connected in a manner not shown with an external source of air under pressure. Chamber 40 is provided with ports 42, 44 and 46 which communicate with cylinder 12. Two discharge ports 50 and 52 also communicate with cylinder 12. Ports 54 and 56 communicate with the opposite ends of cylinder 12. A passageway 58 connects ports 50, 52, 54 and 56 with a discharge port 60.

Ports 54 and 56 are provided with flow restrictions 62 and 64, respectively, for reasons set forth hereinbelow. Two ports 70 and 72 connect the cylinder 12 with discharge ports 74 and 76, respectively.

A passageway 80 internal of spool 14 connects the chamber 28 with the space 82 at one end of spool 14, while a similar passageway 84 connects chamber 30 with the space 86 at the other end of spool 14.

Referring now to FIG. 1 the device is shown in a position of zero acceleration. Under this condition air from chamber 40 enters chambers 28 and 30 from port 44. Since land 20 of spool 14 is centered in port 44 the amount of air entering chambers 28 and 30 will be equal. Air travels from chambers 28 and 30 through passageways 80 and 84 respectively to chambers 82 and 86, respectively. Because of the restrictions 64 and 62 pressure builds up in chambers 82 and 86 at opposite ends of spool 14.

Air also enters chambers 26 and 32 through ports 42 and 46 but since ports 50 and 52 are open the air escapes and there is little or no airflow from control ports 74 and 76. Any air which may flow from ports 74 and 76 will be equal between the two.

Figure 2:
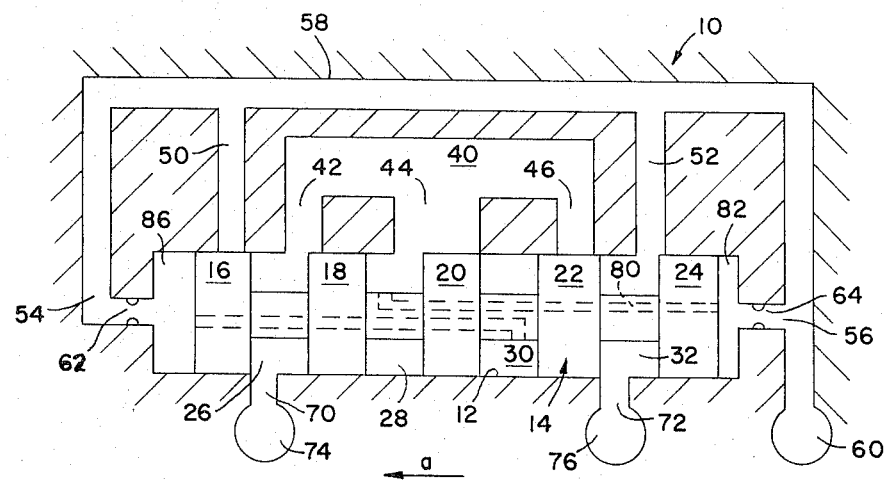
FIG. 2 is similar to FIG. 1 but illustrates the condition of the assembly under acceleration.

Now assuming an acceleration toward the left as viewed in FIG. 2 the spool 14 will shift to the right with respect to housing 10. Under this condition air from chamber 40 enters chamber 28 through port 44, no air enters chamber 30 since access thereto is cut off by land 20 on spool 14. Air from chamber 28 flows through passageway 80 and builds up pressure in chamber 82. This pressure is no longer balanced by pressure in chamber 86 and tends to restore spool 14 to the center position illustrated in FIG. 1. While the spool is illustrated in FIG. 2 shown in an extreme position, a similar effect would be true if spool 14 were only shifted slightly. Under such condition more air would enter chamber 28 than chamber 30 due to the land 20 allowing a larger opening of port 44 to chamber 28 than that open to chamber 30. This would provide an imbalance of pressures in chambers 82 and 86 and the differential pressures would apply a restoring force to spool 14 equal and opposite to the force applied by the mass of the spool times the acceleration applied thereto.

When the spool 14 is in the position shown in FIG. 2, air from chamber 40 passes through port 42 into chamber 26. Since land 16 closes port 50 this air issues from control port 74. No flow will occur at control port 76 since land 22 covers port 46 while port 52 is open to exhaust through passageway 58 and port 60.

Since flow from chamber 40 into chamber 26 is controlled by movement of land 18 and flow from chamber 40 into chamber 32 is controlled by movement of land 22, the amount of control air issuing from ports 74 and 76 will be proportional to the amount of displacement of the spool 14 from its central position. Thus the airflows from ports 74 and 76 are directly proportional to the applied acceleration.

The supply pressure in chamber 40 is maintained high enough so that there will be sonic flow through all ports. Because of the control circuit there will be a linear relationship between acceleration and the position of spool 14. In the presence of a poorly regulated supply pressure the spool will reposition itself at null and therefore give the advantage of an invariant scale factor. The load flow is independent of supply pressure as long as the sonic flow conditions prevail.

While the foregoing is a description of the preferred embodiment the following claims include those modifications that come within the spirit and scope of the invention.

We claim:
1. A pneumatic accelerometer comprising:
   a valve body having cylindrical bore therein,
   a pressure chamber formed in said body adjacent said cylindrical bore and connected to a source of fluid under pressure,
   a spool valve having five spaced lands slideably mounted in said cylindrical bore,
   three spaced ports connecting said pressure chamber with said cylindrical bore one at the mid point of said bore and the other two spaced equally outwardly therefrom,
   two ports connecting said cylindrical bore with exhaust said ports being spaced equally outwardly on opposite sides of the ports connecting said bore with said pressure chamber,
   two ports one connecting each end of said cylindrical bore with exhaust,
   flow passages within said spool valve one connecting the spool between the second and third lands on said spool with the cylindrical bore adjacent the opposite end of said spool and one connecting the space between lands three and four with the cylindrical bore adjacent the other end of said spool, and
   two outlet ports in the wall of said cylindrical bore one communicating with the space between lands one and two and the other communicating with the space between lands four and five.

2. A pneumatic accelerometer as set forth in claim 1 wherein:
   the three central lands on said spool cooperate with the first three mentioned ports to determine the position of said spool within said cylindrical bore, and
   the two outermost lands on each end of said spool cooperating with the outermost of the first three mentioned ports and the two ports connecting the cylindrical bore to exhaust to respectively control the amount of fluid flow through the two outlet ports.

3. A pneumatic accelerometer as set forth in claim 2 wherein restrictions are provided in the ports connecting the end of the cylindrical bore with exhaust.

4. A pneumatic accelerometer as set forth in claim 3 wherein, the pressure in said pressure chamber is maintained sufficient to cause sonic flow at all ports.

* * * * *

UNITED STATES PATENT OFFICE
CERTIFICATE OF CORRECTION

Patent No. 3,782,207      Dated January 1, 1974

Inventor(s) Harold J. Straut, Jr., et al.

It is certified that error appears in the above-identified patent and that said Letters Patent are hereby corrected as shown below:

On the cover sheet, insert -- [73] Assignee: The United States of America as represented by the Secretary of the Army --.

Signed and sealed this 3rd day of September 1974.

(SEAL)
Attest:

McCOY M. GIBSON, JR.
Attesting Officer

C. MARSHALL DANN
Commissioner of Patents